(12) United States Patent
Nyu

(10) Patent No.: US 6,529,977 B1
(45) Date of Patent: Mar. 4, 2003

(54) CIRCUIT AND METHOD FOR RELIABLY PERFORMING BUS RESET REGARDLESS OF CABLE LENGTH

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 09/598,479

(22) Filed: Jun. 22, 2000

(30) Foreign Application Priority Data

Jun. 23, 1999 (JP) ............................................. 11-176169

(51) Int. Cl.[7] ......................... G06F 13/00; G06F 13/42; G06F 1/08; G06F 1/04
(52) U.S. Cl. ..................... 710/100; 710/104; 710/105; 710/106; 713/500; 713/600; 713/601
(58) Field of Search .................................. 710/100, 104, 710/105, 106; 713/500–601

(56) References Cited

U.S. PATENT DOCUMENTS 5,535,208 A * 7/1996 Kawakami et al. ......... 370/391
5,751,721 A * 5/1998 Bloks ......................... 370/509

FOREIGN PATENT DOCUMENTS

JP          2000-13379          1/2000

* cited by examiner

*Primary Examiner*—Rupal Dharia
*Assistant Examiner*—Trisha Vu
(74) *Attorney, Agent, or Firm*—McGinn & Gibb, PLLC

(57) ABSTRACT

In a bus reset process of an IEEE-1394 transceiver circuit, a signal is transmitted to a serial bus and a signal from the bus is received and applied to a higher layer. When a transmit bus reset signal is detected in the transmitted signal, a masking signal is exclusively applied to the higher layer in response to the start timing of the transmit bus reset signal. A receive bus reset signal is detected in the received signal. A count operation is started for incrementing a count value in response to the start timing of the detected receive bus reset signal until the count value exceeds a predetermined value. The received signal is then exclusively applied to the higher layer in response to the end timing of the count operation.

20 Claims, 8 Drawing Sheets

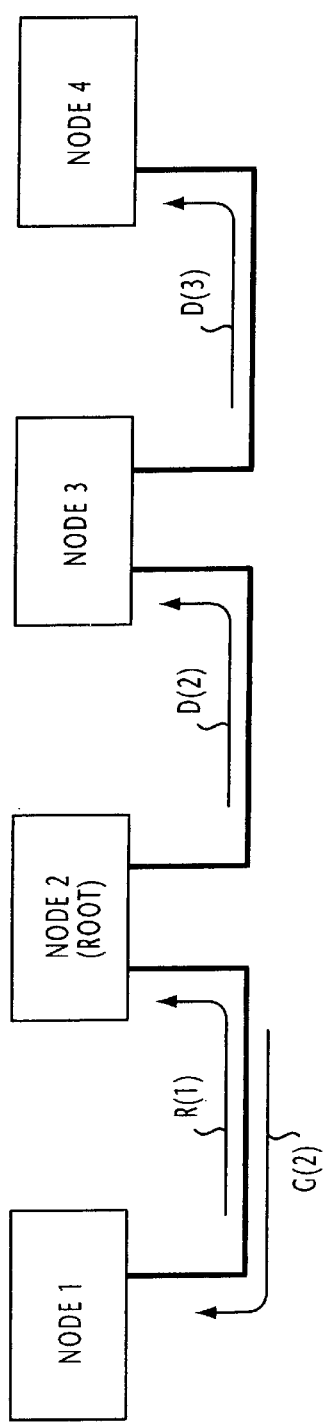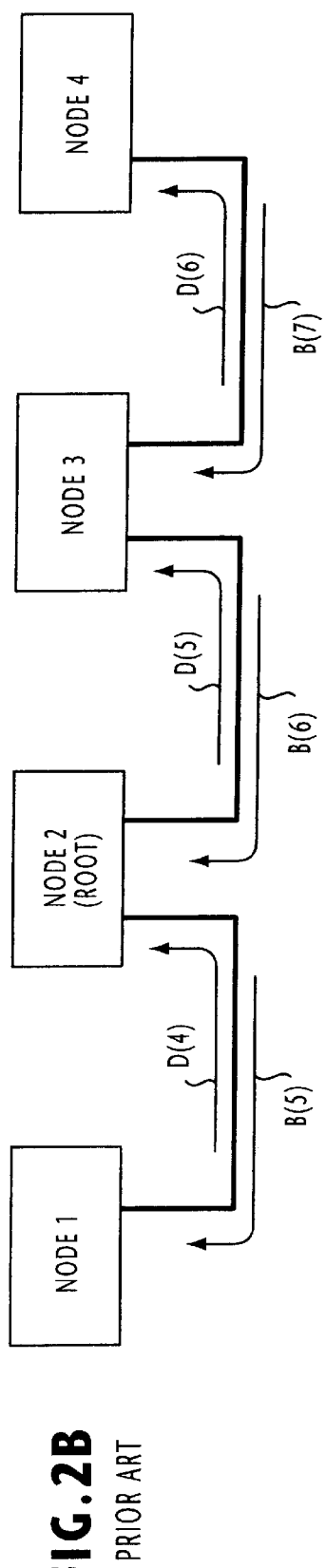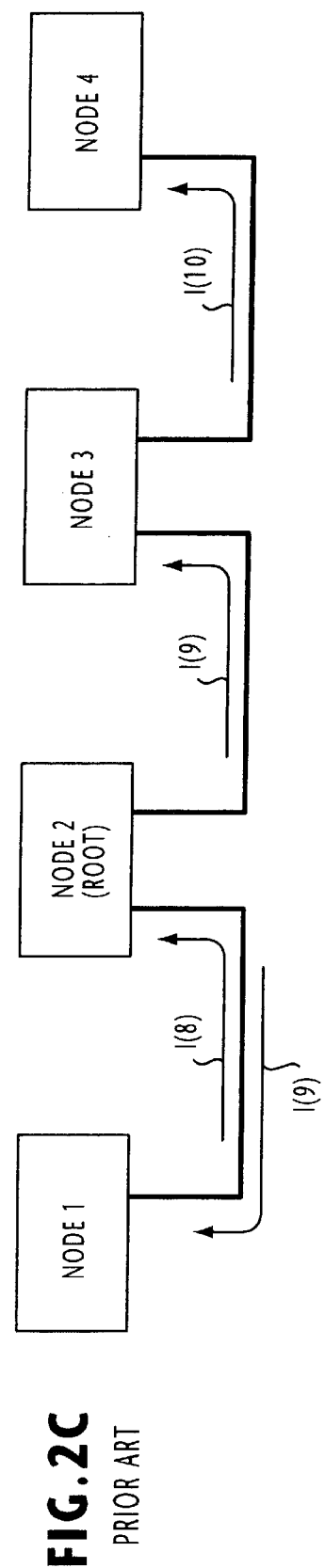
FIG. 2A
PRIOR ART
FIG. 2B
PRIOR ART
FIG. 2C
PRIOR ART

CIRCUIT AND METHOD FOR RELIABLY PERFORMING BUS RESET REGARDLESS OF CABLE LENGTH

BACKGROUND OF THE INVENTION

1. Field of the Invention

The present invention relates to transmission and reception of signals between devices (nodes) attached to a computer over a serial bus such as the IEEE-1394 bus specified according to the IEEE-1394 Standard for a High Performance Serial Bus (or IEEE Std 1394–1995).

2. Description of the Related Art

The IEEE 1394 standard specifies protocols for the transmission and reception of various control signals and communication signals between peripheral devices of a computer such as printers, hard disk drives, scanners, digital cameras (nodes) at different layers of each node connected to a serial bus. For the physical layer of each node, a procedure is specified for bus initialization and determination of bus ownership. This procedure is described by a state machine having four broadly classified functions. The bus initialization procedure consists of three network initialization processes (Bus Reset process, Tree ID process, and Self ID process) and a Normal process (for normal communication between nodes).

For each of these processes a number of states are defined. For Bus Reset process, states R0 (Reset Start) and R1 (Reset Wait) are defined, and for Tree ID process states T0 (Tree ID start), T1 (Child Handshake), T2 (Parent Handshake) and T3 (Root Contention) are defined. Similarly, five states are defined for Self ID process, including S0 (Self ID Start), S1 (Self ID Grant), S2 (Self ID Receive), S3 (Send Speed Capabilities) and S4 (Self ID Transmit), and six states are defined for Normal process, including A0 (Idle), A1 (Request), A2 (Grant), TX (Transmit), RX (Receive) and PH (PHY Response). The present invention is primarily concerned with the operation of the Bus Reset process.

Two bus reset processes are defined by the IEEE-1394 standard (P1394a Draft Standard for a High Performance Serial Bus (Supplement), Draft 2.0 Mar. 15, 1998) long bus reset and short bus reset. The cable environment of the standard assumes that the state of the bus is unknown when a bus reset occurs and requires that a reset be long enough to permit all nodes of the bus to receive a long bus reset signal and perform longest transactions within a period of about 166 $\mu$s. Short bus reset is a process in which a node that is performing a bus reset arbitrates for control of the bus prior to asserting reset. The duration of short bus reset is about 1.3 $\mu$s.

In a bus reset process, the operation of a node proceeds according to FIG. 1. When a node detects a bus reset signal at one of its ports when powered on, or operating in a state other than state RX (=Receive) such as Tree ID, Self ID or Normal process, it changes to state R0 (=Reset Start) to begin a bus reset process and sets the reset time to the long reset time of 166 $\mu$s. If the node is in state RX when it detects bus reset, it changes to state R0 and sets the reset time to the short reset time of 1.3 $\mu$s.

In state R0, the node asserts a bus reset signal on all of its active ports. When the short reset time of 1.3 $\mu$s expires the node changes to state R1 (=Reset Wait) in which all ports of the node return bus to idle state. If the node receives an idle or a parent notify signal from all of its active ports before the Reset Wait period of 1.46 ns expires, the state of the node changes to state T0 (=Tree ID Start) which is the initial state of Tree ID process. If all ports of the node receive no idle state signal nor parent notify signal within a period of 1.46 $\mu$s (=the 1.3-$\mu$short reset time plus the 160-ns reset wait time) from state R1, the node returns from state R1 to state R0 and sets the reset time to the long reset time of 166 $\mu$s.

In a short bus reset process that proceeds in a four-node network, for example (see FIG. 2A), a node 1 attempts to gain bus ownership prior to performing a bus reset by asserting a Request signal R(1) on one of the ports of a root node 2 that is authorised to assign bus ownership, changing its state from A0 (=Idle) to A1 (=Request). In response, the root node 2 returns a Grant signal G(2) to node 1 and asserts a Data Prefix signal D(2) on its other port, which is repeated by a node 3 as a Data Prefix signal D(3) to node 4. Nodes 3 and 4 change their state from A0 to RX. Node 1 responds to the Grant signal G(2) by changing its state from A1 to TX (=Transmit). Node 1 FIG. 2B) changes to R0 (=Reset Start) by asserting a Data Prefix DP(4) followed by a Bus Reset signal and receiving a Bus Reset signal B(5) from the root node 2. The Data Prefix DP(4) and the following Bus Reset are repeated by root node 2 as D(5) which is repeated by node 3 as D(6) to node 4. Node 3 and 4 return Bus Reset signals B(6) and B(7) to nodes 2 and 3, respectively, and change their state from RX to R0 (=Reset Start) by setting reset time to the short reset time. When all nodes have changed their state to R1, nodes 1, 2, and 3 assert idle signals I(8), I(9) and I(10), respectively, to start a Tree ID process (FIG. 2C).

However, if the cable length between two nodes is longer than the 4.5 meter limit of the data-strobe link of the 1394 standard, there is a high likelihood of a bus reset signal from a node arriving on the node at the opposite end of the cable after expiration of the short reset time of 1.3 $\mu$s, even if the source node is performing a short bus reset. Hence, the source node must perform a long bus reset. This is a serious problem for a bus environment in which internodal bus length is more than 50 meters by use of 8B/10B block coding and unshielded twisted pairs or fiber optic links (for further information, see P1394b Draft Standard for a High Performance Serial Bus (Supplement) Draft 0.17, Feb. 5, 1999).

Assume that the nodes 2 and 3 are interconnected by a long-distance cable as shown in FIG. 3 and that node 1 changes from A0 (=Idle) to A1 (=Request) by asserting a Request to node 2, which grants bus ownership and asserts a Data Prefix DP1 to node 3. Node 1 shifts to TX by asserting a Data Prefix DP2 and changes to state R0 by signalling a Bus Request BR1 to node 2, resulting in the node 2 changing to state R0 by simultaneously asserting a Bus Request BR2 to nodes 1 and 3. Node 3 changes its state from RX to R0 by signalling a Bus Request BR3 to nodes 2 and 4. When the short reset period of 1.3 $\mu$s expires at node 2, it changes state from R0 to R1 by signalling an idle state ID2 to nodes 1 and 3. Similarly, the short reset time expires at node 2 and it changes from R0 to R1 by signaling an idle state ID3 to nodes 2 and 4. Root node 2 will change its state from R1 to R0 if the critical period of 1.46 $\mu$s expires. Since an idle or a parent notify signal should arrive a 1.46-$\mu$s period after the root node 2 changes to state R1 in order for it to reliably perform a short bus reset, the idle signal ID3 must arrive on node 2 within the 1.46-$\mu$s critical period after the short reset period of 1.3 $\mu$s. However, due to the long transmission delay between nodes 2 and 3, the idle state signal ID3 arrives on node 2 after the 1.46-$\mu$s critical period and the node 2 changes to state R0, rather than T0, and sets the bus reset to the long reset time. In order for the node 2 to perform a short bus reset, an idle state or a parent notify state should arrive within a total period of 2.76 µs after the node 2 asserted Bus Reset BR2 to node 3.

In a long-distance cable environment, the maximum turn-around time between two nodes is given by:

$$2\times 1.3\ \mu s+0.16\ \mu s>2\ \text{(cable delay+physical-layer delay)}+1.3\ \mu s$$

therefore, $$1.3\ \mu s+0.16\ \mu s>2\ \text{(cable delay+physical-layer delay)}$$

If the physical-layer delay is 300 µs and the cable delay is 5 s/meter, the cable length between two nodes must not exceed 78 meters.

Additionally, in a data-strobe cable environment in which the internodal cable length is longer than 4.5 meters, use of a short reset time larger than the currently defined value of 1.3 µs may be considered. However, nodes using the 1.3-µs short reset time and those using a modified short reset time cannot properly be combined in a single network since there is an upper limit to the modified short reset time. For example, if the nodes 2 and 3 have different short reset times as shown in FIG. 4, it is necessary to satisfy the following relation:

$$2\times\text{(cable delay+physical-layer delay)+modified short reset time}<2.76\ \mu s$$

If the cable delay is 5 ns/meter and the physical layer delay is 144 ns, the modified short reset time must be smaller than 2.4 µs. Therefore, in a data-strobe cable environment, there is an upper limit on the internodal cable length.

SUMMARY OF THE INVENTION

It is therefore an object of the present invention to provide a transceiver circuit and method for reliably performing a short bus reset in a cable environment in which the internodal cable length is longer than 4.5 meters in the case of data-strobe links or longer than 78 meters in the case of long-distance links using a signalling scheme such as 8B/10B block codes.

According to a first aspect of the present invention, there is provided a transceiver circuit comprising a line transmitter for transmitting a signal from a higher layer to a transmission medium, a line receiver for receiving a signal from the transmission medium, a first detector for producing a first detector output if a first bus reset signal is detected in the signal transmitted from the line transmitter, and a second detector for producing a second detector output when the second bus reset signal is being detected in the received signal Control circuitry is provided for normally applying the received signal to the higher layer. A selector is provided having a first position in which the selector is normally coupling the received signals to the higher layer and a second position in which the selector is coupling a masking signal to the higher layer. Control circuitry sets the selector in the second position in response to a start timing of the first detector output, starts a count operation for incrementing a count value in response to a start timing of the second detector output until the count value exceeds a predetermined value, and sets the selector in the first position in response to the end timing of the count operation.

According to a second aspect, the present invention provides a method of performing a bus reset process, comprising the steps of (a) transmitting a signal to a transmission medium and receiving a signal therefrom, (b) applying the received signal to a higher layer, (c) detecting a transmit bus reset signal in said transmitted signal, (d) exclusively applying a masking signal to said higher layer in response to a start timing of the transmit bus reset signal, (e) detecting a receive bus reset signal in the received signal, (f) activating a count operation for incrementing a count value in response to a start timing of the receive bus reset signal until the count value exceeds a predetermined value, and (g) exclusively applying the received signal to said higher layer in response to an end timing of the count operation.

BRIEF DESCRIPTION OF THE DRAWINGS

The present invention will be described in detail with reference to the accompanying drawings, in which:

FIGS. 2A–2C show signal flows within a prior art four-node network when performing a short bus reset process;

DETAILED DESCRIPTION

Figure 1:
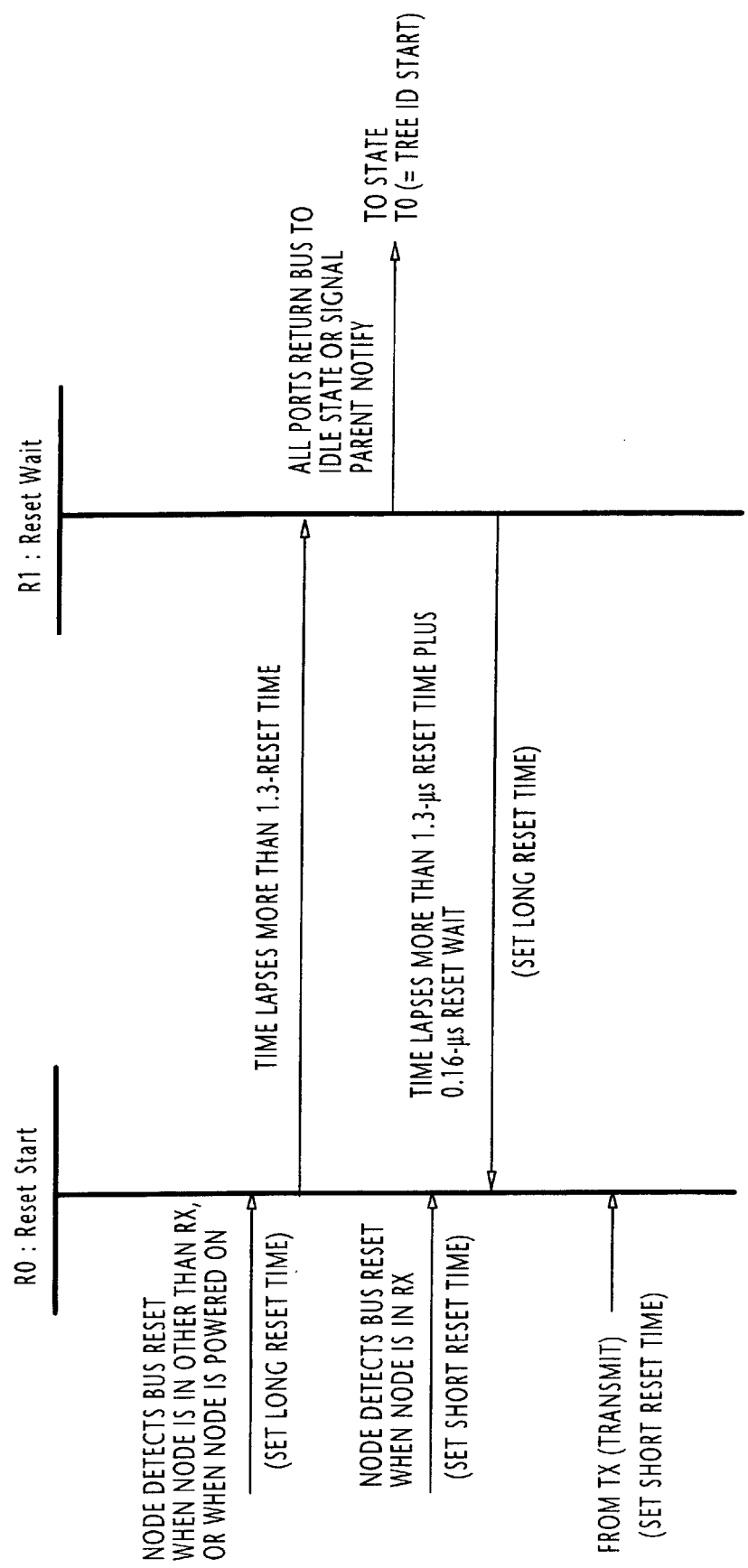
FIG. 1 shows a state machine of an IEEE-1394 node when performing a bus reset process.
Figure 3:
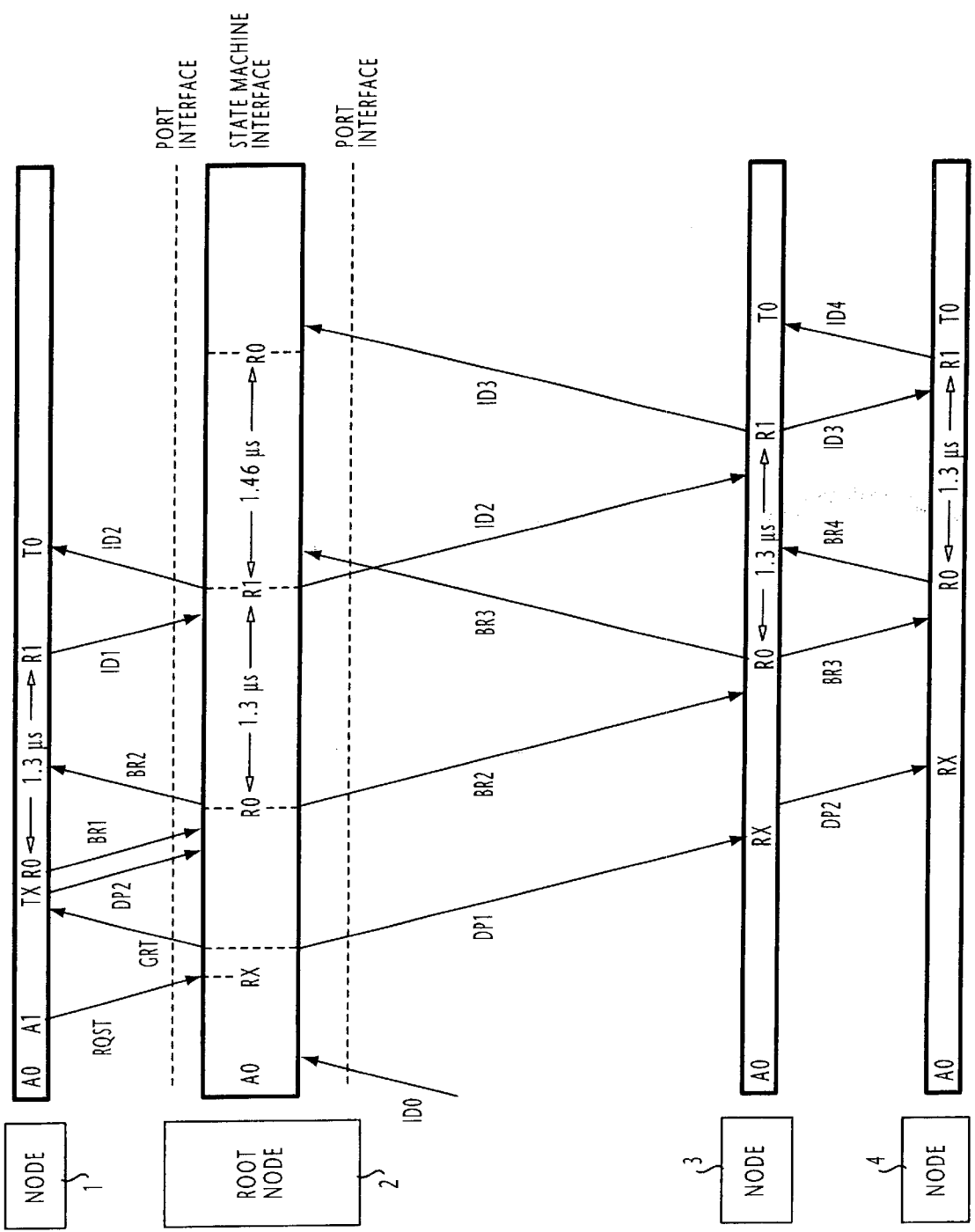
FIG. 3 is a sequence diagram of a prior art four-node network in which a short bus reset is performed between nodes in a long-distance cable environment using a signalling scheme such as 8B/10B block coding.
Figure 4:
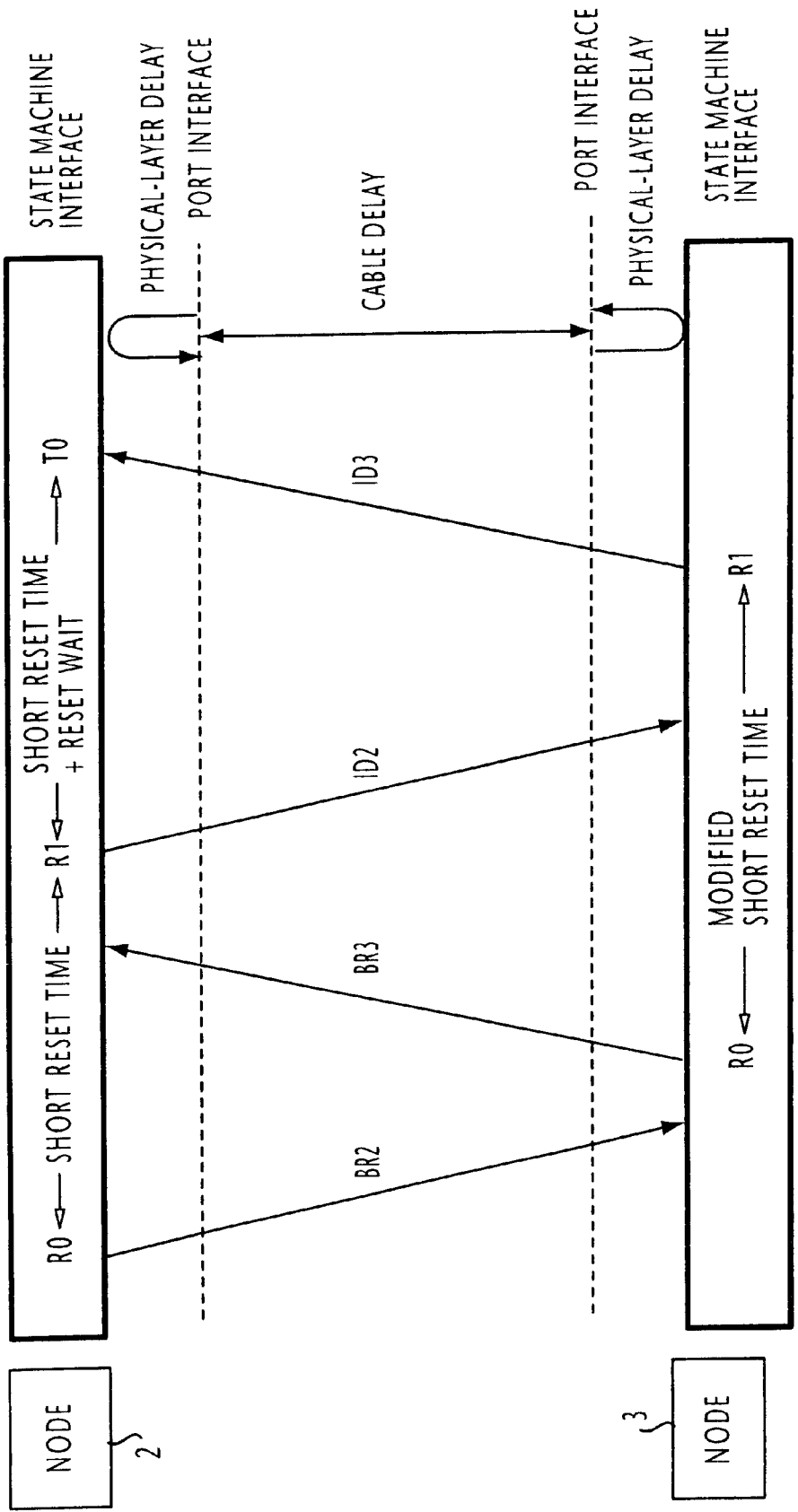
FIG. 4 is a sequence diagram of a prior art data-strobe cable environment in which two nodes are performing a short bus reset using different values of reset time.
Figure 5:
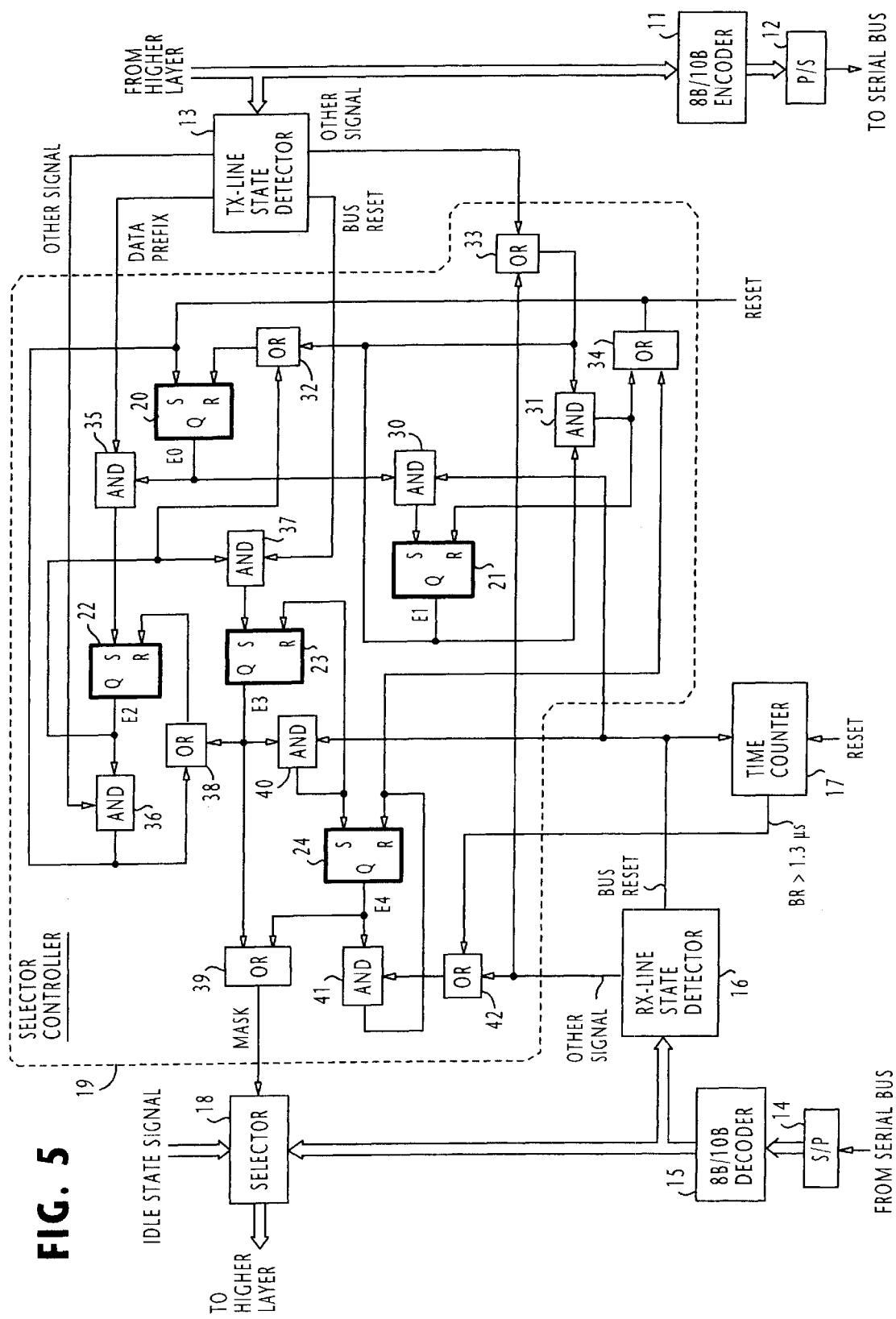
FIG. 5 is a block diagram of a node having a transceiver circuit of the present invention.

Referring now to FIG. 5, there is shown a transceiver circuit of the IEEE-1394 standard according to the present invention. This circuit can be used as a long-distance port of an IEEE-1394 network node, and includes an 8B/10B block encoder 11 for encoding a signal from a higher layer to coded parallel data, which is converted to a serial bit stream by a parallel-to-serial converter 12 for transmission to a serial bus whose length to an adjacent node is longer than 4.5 meters. The parallel data from the higher layer is further supplied to a transmit line state detector 13 for detecting data prefix signal, bus reset signal and signals other than bus reset and data prefix.

On the receive side of the transceiver circuit, signals from the serial bus are converted by a serial-to-parallel converter 14 to parallel data which is decoded by an 8B/10B decoder 15 for application to a receive line state detector 16 for detecting bus reset signal and non-bus reset signal. A time counter 17 is provided for receiving a bus reset signal detected by the RX line state detector 16 to continuously increment a count value during the presence of the detected bus reset signal and produces an output signal when the count value exceeds a threshold value of 1.3 µs. The time-out period of the counter 17 corresponds to the time taken to perform a bus reset. The output of the decoder 15 is also applied to a selector 18 which operates as a line-signal masking circuit for masking the state machine (higher layer) in response to a control signal from a selector controller 19. A pseudo-idle state signal is used for masking the state machine to prevent it from responding to received line state signals.

Selector controller 19 receives the outputs of line state detectors 13 and 16 and the output of counter 17. Selector controller 19 operates according to a state diagram shown in FIG. 6. The state diagram has five states E0 to E4 which may be implemented by flip-flops 20 to 24 and state transitions are controlled by various logic gates 30 to 42.

Figure 6:
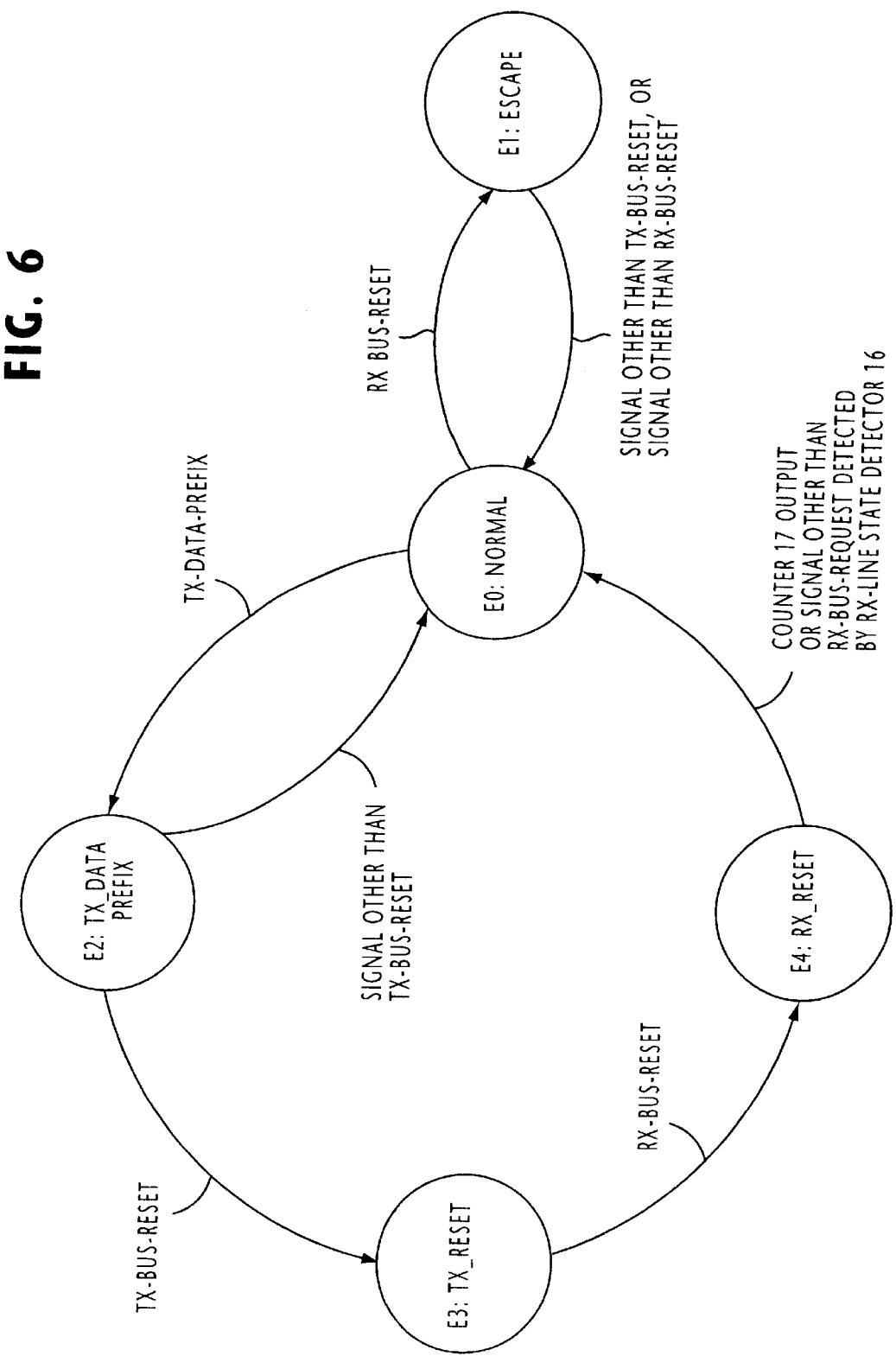
FIG. 6 is a transition diagram of the selector control circuit of FIG. 5.

Prior to describing the operation of the selector controller 19 of FIG. 5, reference is first made to FIG. 6. The transition states are E0 (=Normal), E1 (=Escape), E2 (=Tx Data Prefix), E3 (=Tx Reset) and E4 (=Rx Reset).

When the selector controller 19 receives a signal from the TX-line state detector 13 indicating that a bus reset signal is received from the higher layer during state E0, it changes to state E1. Selector controller 19 returns to state E0 when either the TX line state detector 13 or the RX line state detector 16 detects a signal other than bus reset. If the TX line state detector 13 detects a data prefix signal, the controller 19 changes from E0 to E2, and then returns to E0 if the TX line state detector 16 detects a signal other than the TX-bus reset. A state transition from E2 to E3 occurs when the controller 19 receives a signal indicating that a TX-bus-reset signal is being detected by the TX line state detector 13 in data received from the higher layer.

State E3 indicates the start timing of a masking control signal to be applied to the selector 18. Selector controller 19 maintains state E3 as long as it is receiving the TX-bus-reset indicating signal from the TX-line state detector 13. State transition from E3 to E4 takes place when the controller 19 receives a signal from the RX-line state detector 16 indicating that an RX-bus reset signal is being detected in the output of decoder 15. If the RX-bus reset signal is a short bus reset (SBR) signal (i.e., 1.3 $\mu$s or smaller), the RX-line state detector 16 detects a signal other than bus reset at the end timing of the SBR signal and the controller 19 changes its state to E0. The E4–E0 state transition indicates the end timing of the masking signal. If the RX-bus reset signal is a long bus reset (LBR) signal (i.e., longer than 1.3 $\mu$s), the counter 17 produces an output signal that causes the controller 19 to change its state to E0.

The description of the operation of the selector controller 19 of the root node 2 will be given below with reference to FIGS. 5, 6 and 7. Controller 19 is initially set to E0 (Normal) by setting the flip-flop 20 and all other flip-flops in response to an internal reset signal. Selector 18 is conditioned to supply the output of decoder 15 to the higher layer. Thus, the AND gate 30 is enabled for responding to an RX-bus-reset indicating signal from the RX-line state detector 16 by setting the flip-flop 21. The output of flip-flop 21 is used to enable the AND gate 31 and to reset the flip-flop 20 through OR gate 32. Thus, the controller 19 changes its state from E0 (Normal) to E1 (Escape). If either line state detector detects a signal other than bus reset signal, the AND gate 31 is activated through OR gate 33, and the flip-flop 20 is set via OR gate 34, resulting in a state transition from E1 to E0.

The AND gate 35 is ready to respond to a signal from the TX-line state detector 13, indicating that a data prefix signal is detected, for setting the flip-flop 22, while resetting the flip-flop 20 through OR gate 32 and enabling AND gates 36 and 37. Selector controller 19 changes its state from E0 to E2 (TX-Data Prefix), as shown in FIG. 7. If the TX-line state detector 13 detects a signal other than bus reset and data prefix signals, the AND gate 36 is rendered active, resetting the flip-flop 22 through OR gate 38 and setting the flip-flop 20 again, returning to state E0. If the TX-line state detector 13 detects a bus reset signal BR2 transmitted to the node 3 (FIG. 7), the AND gate 37 is activated for setting the flip-flop 23 and resetting the flip-flop 22 through OR gate 38, changing state from E2 to E3 (TX-Reset). The output of flip-flop 23 is coupled through OR gate 39 to the selector 18 as the start timing of a masking signal. As a result, the selector 18 couples the idle state signal, instead of the output of decoder 15, to the higher layer.

AND gate 40 is conditioned to set the flip-flop 24 in response to a signal from the RX-line state detector 16, indicating that a bus reset signal BR3 is arriving from the node 3. Controller 19 changes its state from E3 to E4 (RX Reset). In response to the setting of flip-flop 24, the AND gate 41 is enabled to respond to the output of an OR gate 42 whose inputs are connected from the RX-line state detector 16 and the time counter 17. The output of flip-flop is coupled through OR gate 39 to the selector 18 to continue the application of the idle state signal to the higher layer.

AND gate 41 will be activated in response to the output of OR gate 42 if the time counter 17 produces a signal indicating that an RX-bus reset signal continues for a period longer than 1.3 $\mu$s, or the RX-line state detector 16 produces a signal indicating that a signal other than RX bus reset signal occurs during the time-out period of 1.3 $\mu$s. When the AND gate 34 is activated, the flip-flop 24 is reset and the flip-flop 20 is set again through OR gate 34. Selector controller 19 now changes its state from E4 to E0 and the output of decoder 15 is coupled to the higher layer, instead of the idle state signal.

Figure 7:
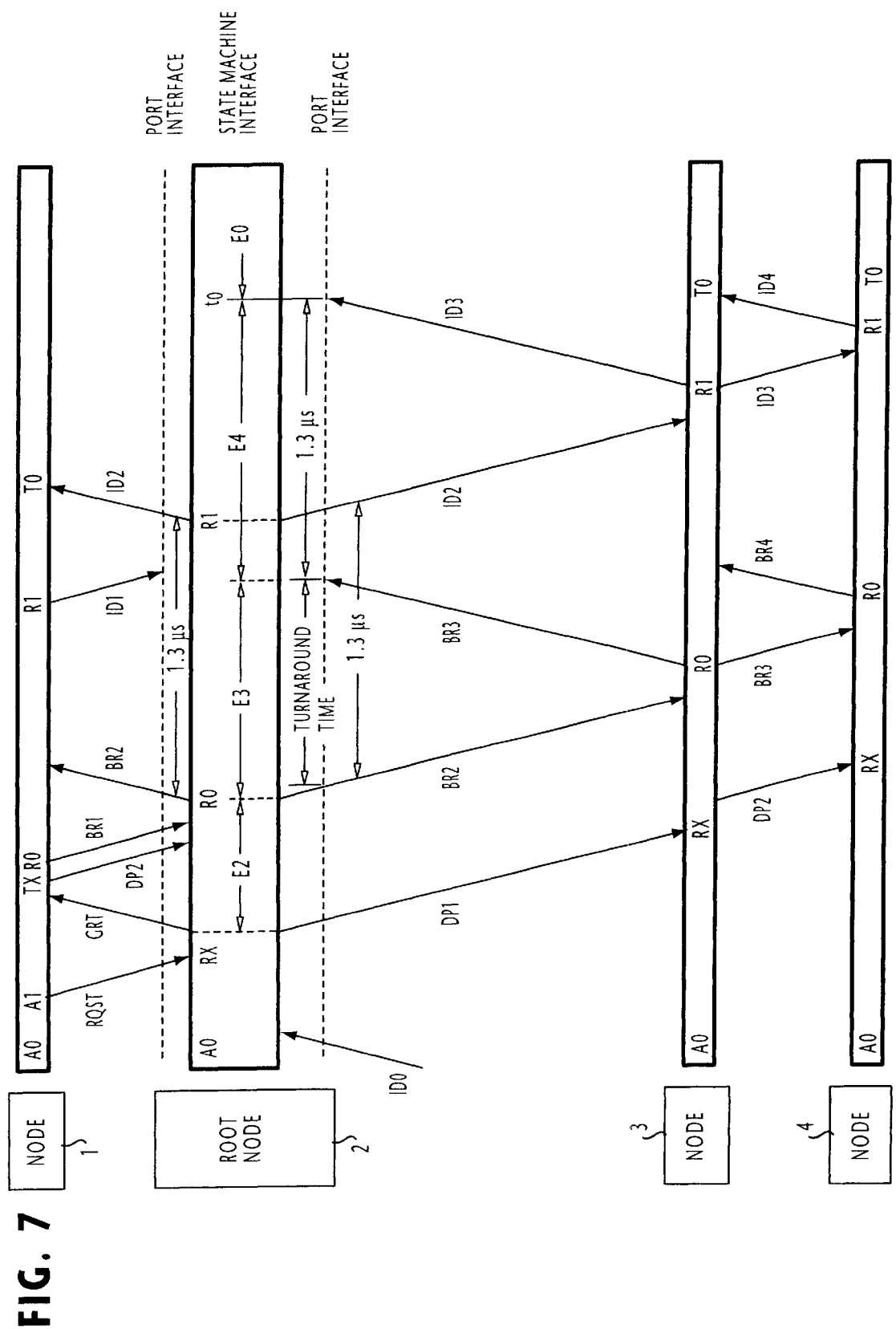
FIG. 7 is a sequence diagram of a four-node network in which a short bus reset is performed between nodes in a long-distance cable environment according to the present invention.

If the reset signal BR3 is a short bus reset (SBR) of less than 1.3-$\mu$s duration, the RX-line state detector 16 detects a signal other than bus reset and data prefix signals and the transition from E4 to E0 takes place at time $t_3$ prior to the time-out instant $t_0$ of time counter 17 (FIG. 7). If the reset signal BR3 is a long bus reset (LBR), the counter 17 produces an output signal and the transition from E4 to E0 takes place at time $t_0$ which coincides with the time-out instant of time counter 17.

It will be seen that if the node 3 is asserting a short bus reset on node 2, the higher layer is completely masked by the idle state signal so that a bus reset can be performed reliably regardless of the length of the long distance cable. If the node 3 is asserting a long bus reset, this signal is coupled to the higher layer at the instant the selector 18 is switched from the masking position to the normal position when the time-out period of counter 17 expires a time-out period of 1.3 $\mu$s after the start timing of the long bus reset.

Figure 8:
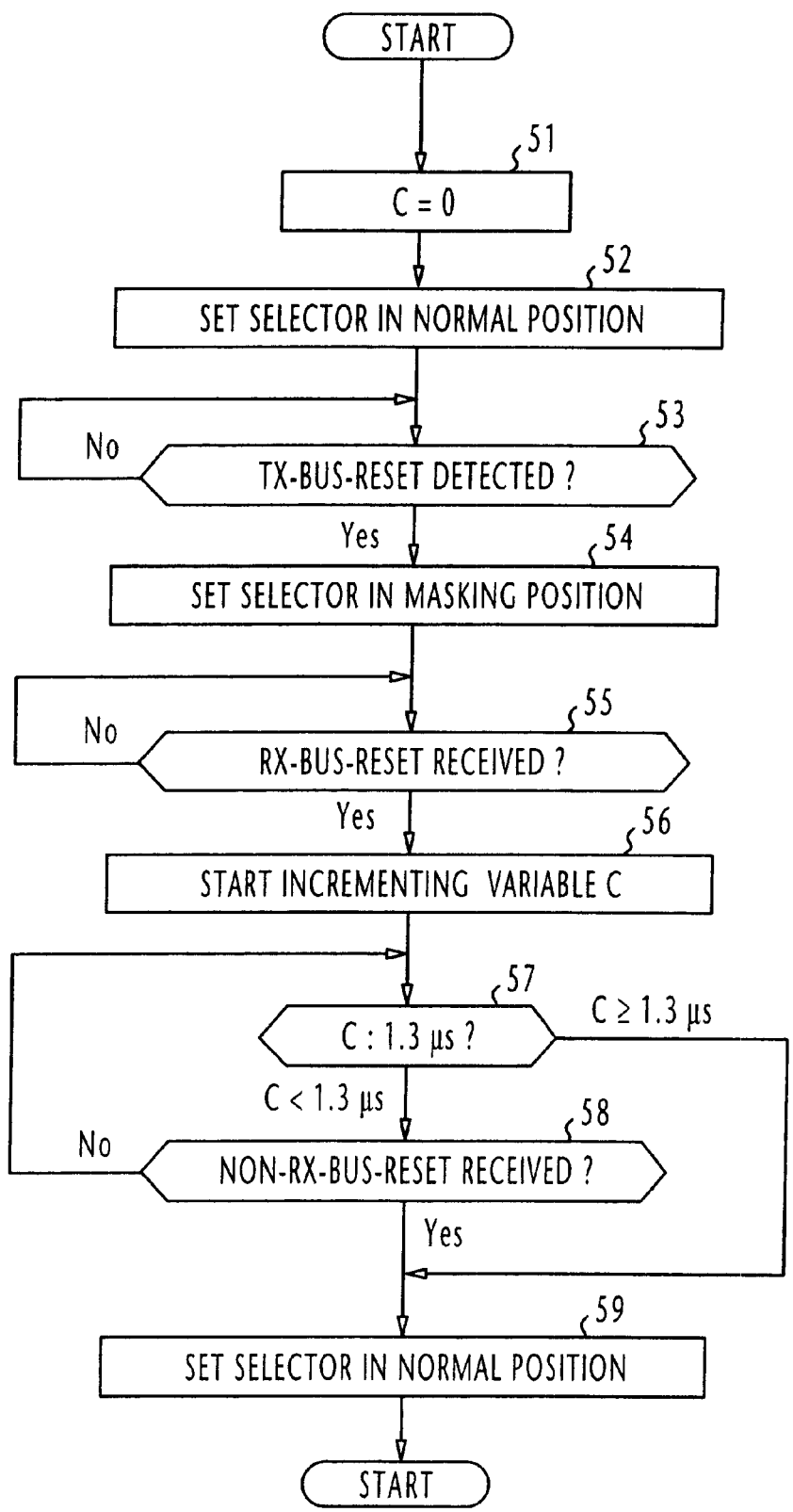
FIG. 8 is a flowchart for implementing the present invention in a programmed routine stored in a recording medium.

Selector controller 19 and counter 17 may be implemented by a programmed routine stored in a storage medium, as shown in FIG. 8. A count variable C is set equal to zero at step 51, and the selector 18 is switched to the normal position for coupling the output of decoder 15 to the higher layer (step 52). If a TX-bus reset signal is detected by the TX-line state detector 13 at step 53, the selector 54 is set in the masking position (step 54). If an RX-bus reset signal is received by the RX-line state detector 16 (step 55), the controller 19 starts incrementing the count variable C at step 56 and compares it to a threshold value that represents the time-out period of 1.3 $\mu$s (step 57). If C is smaller than the threshold value, flow proceeds to step 58 to determine whether a signal other than bus reset is received by the RX-line state detector 16. If the decision at step 58 is negative, step 57 is repeated. If the decision at step 57 or 58 is affirmative, the controller 19 proceeds to step 59 to set the selector 18 in the normal position and then terminate the routine.

What is claim is:

1. A transceiver circuit comprising:
   a line transmitter for transmitting a signal from a higher layer to a transmission medium;
   a line receiver for receiving a signal from said transmission medium;
   a first detector for producing a first detector output if a first bus reset signal is detected in the signal transmitted from said line transmitter;
   a second detector for producing a second detector output when said second bus reset signal is being detected in the received signal;
   a selector having a first position in which the selector is normally coupling the received signals to said higher layer and a second position in which the selector is coupling a masking signal to said higher layer; and
   control circuitry for sing the selector in the second position in response to a start ting of said first detector output, starting a count operation for incrementing a count value in response to a start timing of the second detector output until the count value exceeds a predetermined value, and setting the selector in the first position in response to an end timing of the count operation.

2. The circuit of claim 1, wherein said control circuitry is arranged to set the selector in the first position in response to an end timing of the second detector output if the same is earlier than the end timing of the count operation, or in response to the end timing of the count operation if the same is earlier than the end timing of the second detector output.

3. The circuit of claim 2, wherein said transmission medium is a serial bus and wherein said line transmitter includes an encoder for coding the signals from said higher layer to a coded parallel signal and a parallel-to-serial converter for converting the encoded parallel signal to an encoded serial signal for transmission to said serial bus, and said line receiver includes a serial-to-parallel converter for converting a coded serial signal from the serial bus to a parallel coded signal and a decoder for decoding the parallel coded signal to a parallel decoded signal for application to the first position of said selector.

4. The circuit of claim 1, wherein said masking signal is a pseudo-idle state signal.

5. The circuit of claim 1, wherein said first detector is arranged to produce a third detector output if a data prefix signal is detected in the transmitted signal, and wherein said control circuitry is arranged to:
   change from a first state to a second state in response to the second detector output for setting the selector in said first position, and return from the second state to the first state in response to a signal other than said first and second detector outputs, and change from the first state to a third state in response to the third detector signal,
   return from the third state to the first state in response to a signal other than first and third detector outputs and change from the third state to a fourth state in response to said first detector output for setting said selector in said second position, and
   change from the fourth state to a fifth state in response to the second detector output, and change from the fifth state to the first state in response to the end timing of said count operation for setting the selector in the first position.

6. The circuit of claim 1, wherein said predetermined value represents the length of time taken to perform a bus reset.

7. The circuit of claim 1, wherein said transmission medium is a serial bus and wherein said line transmitter includes an encoder for coding the signals from said higher layer to a coded parallel signal and a parallel-to-serial converter for converting the encoded parallel signal to an encoded serial signal for transmission to said serial bus, and said line receiver includes a serial-to-parallel converter for converting a coded serial signal from the serial bus to a parallel coded signal and a decoder for decoding the parallel coded signal to a parallel decoded signal for application to the first position of said selector.

8. The circuit of claim 7, further comprising an IEEE-1394 interface connected to said serial bus.

9. A communication system comprising:
   a plurality of nodes interconnected by transmission mediums;
   each of said nodes comprising:
   a line transmitter for transmitting a signal from a higher layer to a transmission medium;
   a line receiver for receiving a signal from said transmission medium;
   a first detector for producing a first detector output if a first bus reset signal is detected in the signal transmitted from said line transmitter;
   a second detector for producing a second detector output when said second bus reset signal is being detected in the received signal;
   a selector having a first position in which the selector is normally coupling the received signals to said higher layer and a second position in which the selector is coupling a masking signal to said higher layer; and
   control circuitry for setting the selector in the second position in response to a start timing of said first detector output, starting a count operation for incrementing a count value in response to a start timing of the second detector output until the count value exceeds a predetermined value, and setting the selector in the first position in response to an end timing of the count operation.

10. The communication system of claim 9, wherein said control circuitry is arranged to set the selector in the first position in response to an end timing of the second detector output if the same is earlier than the end timing of the count operation, or in response to the end timing of the count operation if the same is earlier than the end timing of the second detector output.

11. The communication system of claim 9, wherein said masking signal is a pseudo-idle state signal.

12. The communication system of claim 9, wherein said first detector is arranged to produce a third detector output if a data prefix signal is detected in the transmitted signal, and wherein said control circuitry is arranged to:
   change from a first state to a second state in response to the second detector output for setting the selector in said first position, and return from the second state to the first state in response to a signal other than said first and second detector outputs, and change from the first state to a third state in response to the third detector signal,
   return from the third state to the first state in response to a signal other than first and third detector outputs and change from the third state to a fourth state in response to said first detector output for setting said selector in said second position, and
   change from the fourth state to a fifth state in response to the second detector output, and change from the fifth state to the first state in response to the end timing of said count operation for setting the selector in the first position.

13. The communication system of claim 9, wherein said predetermined value represents the length of time taken to perform a bus reset.

14. The communication system of claim 9, wherein said transmission medium is a serial bus and wherein said line transmitter includes an encoder for coding the signals from said higher layer to a coded parallel signal and a parallel-to-serial converter for converting the encoded parallel signal to an encoded serial signal for transmission to said serial bus, and said line receiver includes a serial-to-parallel converter for converting a coded serial signal from the serial bus to a parallel coded signal and a decoder for decoding the parallel coded signal to a parallel decoded signal for application to the first position of said selector.

15. The communication system of claim 14, wherein each of said nodes further comprises an IEEE-1394 interface connected to said serial bus.

16. A method of performing a bus reset process, comprising the steps of:
   a) transmitting a signal to a transmission medium and receiving a signal therefrom;
   b) applying the received signal to a higher layer;
   c) detecting a transmit bus reset signal in said transmitted signal;
   d) exclusively applying a masking signal to said higher layer in response to a start timing of the transmit bus reset signal;
   e) detecting a receive bus reset signal in the received signal;
   f) activating a count operation for incrementing a count value in response to a start timing of the receive bus reset signal until the count value exceeds a predetermined value; and
   g) exclusively applying the received signal to said higher layer in response to an end tiring of the count operation.

17. The method of claim 16, wherein the step (g) comprises the steps of exclusively applying the received signal to said higher layer in response to an end timing of the receive bus reset signal if the same is earlier than the end timing of the count operation, or in response to the end timing of the count operation if the same is earlier than the end timing of the second bus reset signal.

18. A storage medium for storing a control program for performing a bus reset process, comprising the steps of:
   a) transmitting a signal to a transmission medium and receiving a signal therefrom;
   b) applying the received signal to a higher layer;
   c) detecting a transmit bus reset signal in said transmitted signal;
   d) exclusively applying a masking signal to said higher layer in response to a start timing of the transmit bus reset signal;
   e) detecting a receive bus reset signal in the received signal;
   f) activating a count operation for incrementing a count value in response to a start timing of the receive bus reset signal until the count value exceeds a predetermined value; and
   g) exclusively applying the received signal to said higher layer in response to an end timing of the count operation.

19. The storage medium of claim 18, wherein the step (g) comprises the steps of exclusively applying the received signal to said higher layer in response to an end timing of the receive bus reset signal if the same is earlier than the end timing of the count operation, or in response to the end timing of the count operation if the same is earlier than the end timing of the second bus reset signal.

20. The storage medium of claim 18, wherein said masking signal is a pseudo-idle state signal.

* * * * *